March 3, 1964 F. G. STEELE 3,123,818

BIDIRECTIONAL QUANTIZER

Original Filed Jan. 23, 1957

INVENTOR:
Floyd G. Steele
By Marvin H. Kleinberg
Attorney 3,123,818
Patented Mar. 3, 1964

1

3,123,818
BIDIRECTIONAL QUANTIZER

Floyd G. Steele, San Diego, Calif., assignor to Digital Control Systems, Inc., La Jolla, Calif.

Original application Jan. 23, 1957, Ser. No. 635,916, now Patent No. 3,063,047. Divided and this application July 19, 1961, Ser. No. 125,257
11 Claims. (Cl. 340—347)

Figure 1:
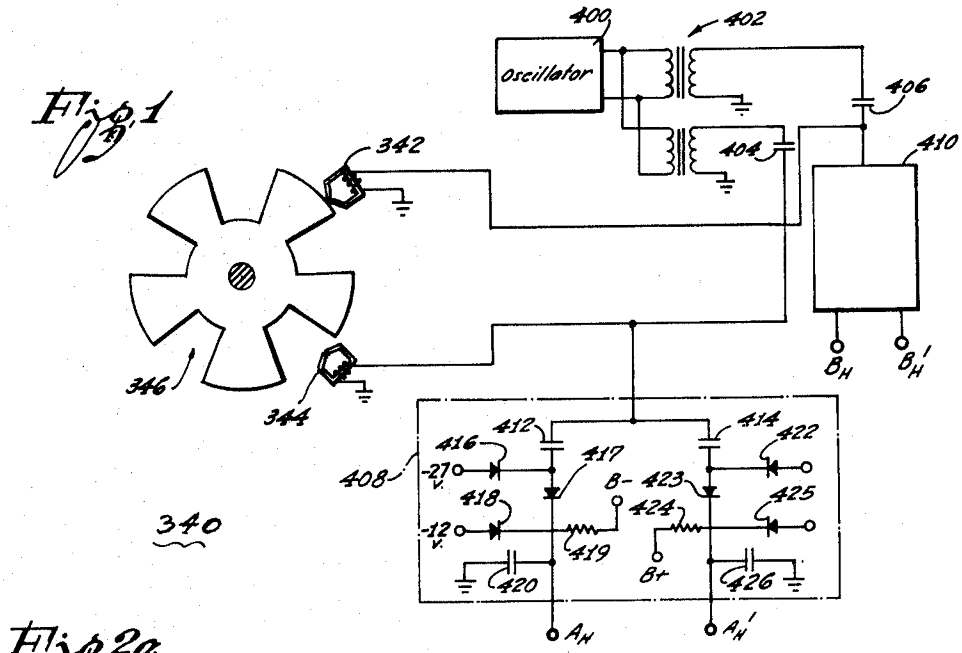

The present invention relates to quantizers and more particularly to a bidirectional quantizer which senses and signals incremental changes in the position of a shaft. This is a divisional application from the copending application of Floyd G. Steele for a "Firing Point Locator System," Serial Number 635,916, filed January 23, 1957, now Patent Number 3,063,047.

In the parent application, there is disclosed a digital computer for determining the position and velocity of a projectile at a point on its trajectory, and which is thereafter operable to iteratively extrapolate the trajectory equations to determine the firing point or impact point.

A novel bidirectional digital servo is also disclosed which is operable to drive a positional element. Associated with the digital servo is a bidirectional quantizer which senses incremental rotational changes in the position of a shaft by sensing changes in the inductive reactances presented by a pair of ferromagnetic core inductors positioned adjacent the periphery of a toothed ferromagnetic disk which rotates in accordance with shaft rotation.

A further novel feature of the quantizer is the detection of incremental changes in the shaft position by generating first and second bilevel signal trains one of which leads the other by 90° when the shaft is rotated at a fixed rate in one direction and which lags the other by 90° when the shaft is rotated at a fixed rate in the opposite direction, a change in the level of the first train signifying an incremental change in rotational position while the polarity of the change is indicated by the level of the second train when the first train is changing levels.

Such a quantizer need not have any rubbing or sliding contacts to provide an indication of shaft position and therefore is not troubled with the problems associated with contact bounce due to wear, dirt, or surface irregularities. Moreover, no frictional resistance to rotation is exhibited by the moving member.

In the prior art, quantizers have been devised to use a ferromagnetic inductor as a pickup adjacent a rotating member and provided some means to change the flux through the inductor as a function of rotation, including toothed ferromagnetic wheels or areas of increased magnetization. A problem inherent in such a quantizer was the direct dependence of the amplitude of the output signal upon the speed of rotation. Clearly, such a quantizer is virtually inoperable with slowly rotating shafts.

It is therefore an object of the inventor to provide a bidirectional digital quantizer which senses incremental changes in the position of a relatively slowly rotating shaft by sensing the change in reactance of a tuned circuit including an element on the rotating shaft and a stationary sensor.

It is an additional object to provide an incremental quantizer which senses changes in position of a rotating shaft by detecting the change in impedance of a tuned circuit including a reactive element whose reactance depends upon the relative position of a disk rotating with the shaft.

2

It is a further object of the invention to provide a quantizer which signals incremental changes in the position of a rotating disk of predetermined configuration by applying an alternating current signal to a tuned circuit including a reactive element adjacent the disk whose impedance depends upon the rotational position of the disk with respect to the reactive element.

It is still another object of the invention to provide a bidirectional digital quantizer which senses incremental rotational changes in the position of a shaft by sensing changes in the inductive reactances presented by a pair of ferromagnetic core inductors positioned adjacent the periphery of a toothed ferromagnetic disk which rotates in accordance with shaft rotation.

Another object of the invention is to provide a bidirectional digital quantizer for detecting incremental changes in the rotational position of a shaft by producing first and second bilevel signal trains one of which leads the other by 90° when the shaft is rotated at a fixed rate in one direction and which lags the other by 90° when the shaft is rotated at a fixed rate in the opposite direction, a change in the level of the first train signifying an incremental rotational change, while the level of the second train at the same instant signifies the sense of the change.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 2A:
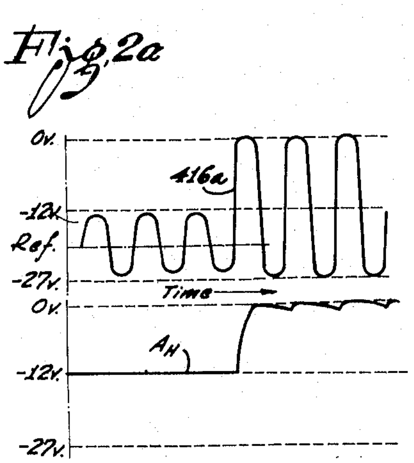
Figure 2B:
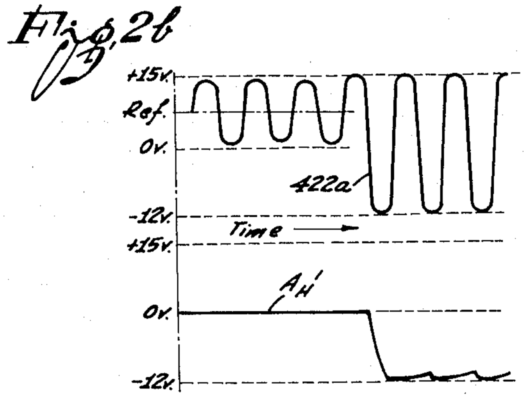
Figure 3A:
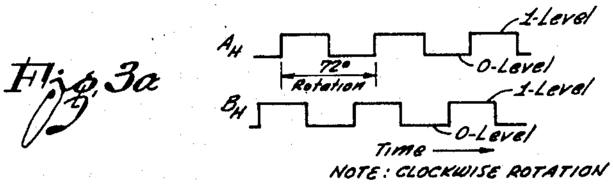
Figure 3B:
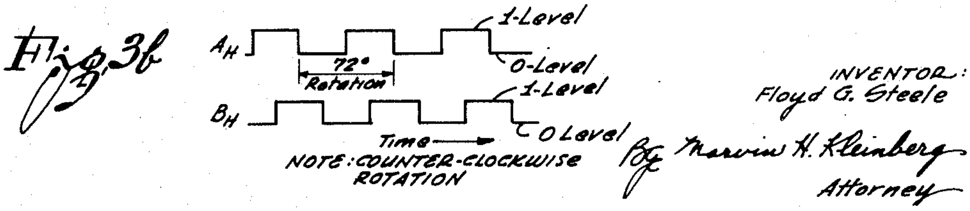

FIG. 1 is a schematic diagram of a quantizer, in accordance with the invention;

FIGS. 2*a* and 2*b* are waveforms of signals apearing at various points in the circuit of FIG. 1; and FIGS. 3*a* and 3*b* are waveforms of the output signals produced by the circuit of FIG. 1, illustrating the manner in which the quantizers of the invention convey output intelligence.

With reference now to FIG. 1, there is shown a schematic diagram of a quantizer 340 which may be utilized in the digital servo of the parent application for presenting output signals representative of changes in the rotational position of a toothed disk 346 as detected by a pair of pickoff heads 342, 344. As illustrated in FIG. 1, the quantizer includes as an oscillator 400 which produces a sine wave output signal which in turn is applied through a transformer 402 to a pair of series L-C circuits, one circuit including a capacitor 404 and the inductance of pickoff head 344 while the other circuit comprises a similar capacitor 406 and the inductance of pickoff head 342. In addition, the quantizer includes a pair of detection circuits 408 and 410 respectively associated with pickoff heads 344 and 342, respectively, each detection circuit in turn including a plurality of rectifiers and capacitors for producing a pair of complementary voltage level output signals representative of the position of its associated pickoff relative to the teeth on toothed disk 346.

Both of pickoff heads 342 and 344 are fixed relative to each other and are positioned adjacent the outer periphery of toothed disk 346, each head comprising a horseshoe shaped ferromagnetic core which presents through its associated winding a variable inductance whose magnitude is dependent upon whether a tooth disk 346 is beneath the air gap in its core. More specifically, the inductance presented by each head is at a maximum when a tooth of disk 346 is adjacent its air gap, and is at a minimum when the air gap in its core is in the space between adjacent teeth.

The values of the capacitor in each L-C circuit are selected to provide an L-C series circuit resonant at the beginning of the applied signal when the inductance is at its maximum value. Consequently, when a tooth is adjacent the gap in a pickoff head a relatively large alternating current signal is presented across the head, whereas a relatively small alternating current signal is presented across the head when the inductance of the head is at its minimum value.

As further illustrated in FIG. 1, each detection circuit is identical and is connected across its associated pickoff head and includes two parallel paths to which the signal appearing across the head is applied by a pair of coupling capacitors 412 and 414, respectively, the parallel paths in detection circuit 408 functioning to produce a pair of complementary output signals $A_H$ and $A'_H$ representative of the relative position of head 344 with respect to the teeth of disk 346, while similar paths in circuit 410 function to produce a pair of complementary output signals $B_H$ and $B'_H$ representative of the relative position of head 342. The left-hand path, as viewed in circuit 408 of FIG. 7, includes a reference diode 416 having its anode connected to a −27 volt source (not shown) and its cathode connected to capacitor 412 and to the anode of a blocking diode 417, the other end of this diode being connected, in turn, to the cathode of a clamping diode 418, to one end of a pull down resistor 419, and to one terminal of an output capacitor 420. The other terminal of capacitor 420 is grounded while the second end of resistor 419 and the anode of diode 418 are connected respectively to a source of B− and to a source of −12 volts, neither of which sources is here shown.

The right-hand path in the detection circuit, in a similar manner, includes a reference diode 422 having its cathode connected to a +15 volt source (not shown), and its cathode connected to capacitor 414 and to the cathode of a blocking diode 423. The anode of diode 423 is then coupled to a B+ source (not shown) by a pullup resistor 424, to the anode of a clamping diode 425 whose cathode is connected to ground, and to one terminal of an output capacitor 426 whose other terminal is grounded.

In the absence of an applied alternating current signal, the voltage across capacitor 420 is normally −12 volts since the pulldown resistor renders diode 418 conductive, whereas the voltage across capacitor 426 is at ground potential owing to the fact that diode 425 is rendered conductive from the B+ source through resistor 424. It also follows, therefore, that the junction of diodes 416 and 417 is floating midway between −12 volts and −27 volts owing to the fact that diodes 416 and 417 are both back-biased, while the junction of diodes 422 and 423 is floating midway between ground and +15 volts since these two diodes are backed-biased.

With reference now to FIGS. 2*a* and 2*b*, there are shown the waveforms appearing at various points in the detection circuit as toothed disk 346 is rotated from its position as shown, relative to head 344, to a position where one of the teeth is adjacent the gap in head 344. As shown by the left-hand portion of the waveforms in FIGS. 2*a* and 2*b*, when the head is adjacent a space in the disk a relatively small alternating current signal is applied to the junction of diodes 416 and 417 and to the junction of diodes 422 and 423 as shown by waveforms **416*a* and 422*a*, the peak-to-peak amplitude of the signal being less than 15 volts so that all four of these diodes remain back-biased. Accordingly, the output signals $A_H$ and $A'_H$ across capacitors 420 and 426** are at −12 volts and ground potential, respectively.

Assuming then that disk 346 rotates so that a tooth is adjacent pickoff head 344, a signal of relatively large amplitude is impressed across the junctions of diodes 416 and 417 and of diodes 422 and 423 as illustrated by waveforms **416*a* and 422*a*, the signal causing diode 417 to conduct as the signal raises the junction of diodes 416 and 417 above −12 volts and causing diode 423 to conduct when its negative going portion falls below ground potential. Consequently diodes 418 and 425 become back-biased, and the voltage across capacitors 420 and 426 tends to follow the signals passed diodes 417 and 423**.

As shown by the waveforms $A_H$ and $A'_H$, respectively, when the signal thereafter goes through regions of negative slope and positive slope, respectively, the voltage across capacitors 420 and 426 does not follow the waveforms **416*a* and 422*a*, but instead provides a form of envelope detection analogous to the detection of the modulating signal in an amplitude modulated carrier signal. This result is produced by the fact that diodes 418 and 425 remain back-biased while the input signal is large, and that diodes 417 and 423 are front-biased only when charge is being added to the capacitors and are back-biased as soon as the alternating current signal goes below the voltage on the associated output capacitor. Consequently capacitors 420 and 426** have only a high impedance discharge path during those portions of the input signal cycle when they are not being charged from the input signal.

The structure and function of detection circuit 410 are identical to the structure and function of circuit 408 described hereinabove, circuit 410 being operable to produce a pair of complementary output signals $B_H$ and $B'_H$ representative of the position of pickoff head 342 relative to disk 346. For purposes of discussion hereinbelow, a high level or ground potential in signal $A_H$ or $B_H$ will be termed a one-representing signal, while a −12 volt or low level voltage will be termed a zero-representing signal. Conversely, complementary signals $A'_H$ and $B'_H$ present a one-representing signal as a low level voltage and a zero-representing signal as a high level voltage.

Consider next then the manner in which the quantizer, including its two detection circuits, indicates a change in the rotational position of toothed disk 346. With reference once more to FIG. 1, if each tooth on disk 346 and an adjacent space are considered to be one cycle or one increment of rotation, then pickoff heads 342 and 344 are 90° out of phase with respect to each other. Referring then to FIGS. 3*a* and 3*b*, there are shown the waveforms of signals $A_H$ and $B_H$ as they appear when disk 346 is rotated at a constant speed, the waveforms of FIG. 3*a* representing clockwise rotation of disk 346 while the waveforms of FIG. 3*b* represent counter-clockwise rotation of the disk. It will be seen that waveform $B_H$ leads waveform $A_H$ by 90° when the disk is rotating in a clockwise direction, and lags waveform $A_H$ by 90° when the disk is rotating in a counterclockwise direction.

Assume now that one complete revolution of disk 346 actuates a mechanical counter (not shown) to produce a change of 100 units in a quantity visually displayed in the counter. Assume also that the maximum rate of rotation of the toothed disk is one-twentieth of a revolution per difunction interval as explained in greater detail in the parent application or, in other words, is of 18° per iteration of an associated computer. It follows then that the maximum rate of change of the quantity by the counter is 5 units per difunction interval.

It will be apparent, however, that for a five-toothed disk such as is shown here, the quantizer is only capable of distinguishing between ten unit increments of the quantity, inasmuch as the quantizer can respond only to such movement of the disk as will produce a change in the output signals $A_H$ and $B_H$, as previously described with regard to FIGS. 3*a* and 3*b*. Thus at the end of a difunction interval the quantizer output signals presented may be identical to those presented at the end of the previous interval, and will therefore indicate that no change has taken place in the counterreading. On the other hand, if the quantizer signals are different from those presented at the end of the previous difunction interval, then a change of either plus ten units or minus ten units is indicated.

In the operation of the quantizer a change in the signal $A_H$ at the end of successive difunction intervals is utilized to indicate that the reading has changed by either plus ten units or minus ten units, whereas if the $A_H$ signal remains at the same level as before a zero change is indicated. The $B_H$ signal, on the other hand, is utilized to indicate whether a change of ten units is positive or negative, since as pointed out previously, the signal $B_H$ either leads or lags the signal $A_H$ depending upon whether the rotation of the counter is clockwise or counterclockwise, respectively.

It will be noted from FIG. 3*a* that the disk is rotating in a clockwise direction if signal $A_H$ goes from its one-representing value or high level to its zero-representing value or low level and signal $B_H$ is at its zero-representing value or low level, whereas FIG. 2*b* illustrates that a high level for signal $B_H$ when signal $A_H$ changes from its high level to its low level indicates an increment of rotation in the counterclockwise direction. In a similar manner these figures illustrate that a change in signal $A_H$ from its low level to its high level represents an increment of clockwise rotation when signal $B_H$ is at its high level, and an increment of counterclockwise rotation when signal $B_H$ is at its low voltage level. All of the foregoing conditions and their operation significance are correlated by the following table, Table II.

*Table II*

| Possible Conditions | Prior $A_H$ | Present $A_H$ | Present $B_H$ | Incremental Change In Rotation |
|---|---|---|---|---|
| 1 | 0 | 0 | 0 | 0 No change. |
| 2 | 0 | 0 | 1 | 0 No change. |
| 3 | 0 | 1 | 0 | −10 units ccl. |
| 4 | 0 | 1 | 1 | +10 units cl. |
| 5 | 1 | 0 | 0 | +10 units cl. |
| 6 | 1 | 0 | 1 | −10 units ccl. |
| 7 | 1 | 1 | 0 | 0 No change. |
| 8 | 1 | 1 | 1 | 0 No change. |

It will be recognized from the foregoing table that it is necessary to store signal $A_H$ at the end of each difunction signal interval so that it may be compared with the signal $A_H$ as it is presented at the conclusion of the following interval to determine if there has been a change in its voltage level. As will be disclosed in more detail hereinbelow, the storage of signal $A_H$ is accomplished in a detailed computer, described in the parent application, in accordance with the level of the signal.

It will be clear to those skilled in the art that the principles of position detection utilized in the preferred embodiment can easily be applied to a coded pattern encoder in which multiple sensors are used to signal directly the position of the encoder relative to the sensors in a predetermined code such as binary or reflected binary, and that the term "quantizer" encompasses such devices as well as incremental counters of the type shown in the drawing.

For such an application, additional toothed disks might be mounted on a common shaft with different teeth configurations or a single toothed disk could be provided with concentric cutout patterns in a predetermined "coded" configuration.

However, such an embodiment is clearly within the scope of the instant invention and the appended claims.

What is claimed is:

1. A bidirectional digital quantizer for generating electrical output signals representative of changes in the rotational position of a shaft, the combination comprising: a toothed disk coupled to the shaft and rotatable in accordance therewith; a reactive element positioned adjacent said disk for modulating an applied alternating current signal to have first and second voltage amplitudes in accordance with the reactance of said reactive element, said reactive element presenting a first reactance when a tooth in said disk is adjacent said reactive element and a second reactance when a space between teeth on said disk is adjacent said reactive element; means for applying the alternating current signal directly across said reactive element; and means responsive to the modulated alternating current signal for generating output signals in accordance with the voltage amplitude of the modulated alternating current signal whereby the output signals are representative of the rotational position of said disk relative to said reactive element.

2. A bidirectional digital quantizer for generating electrical output signals representative of changes in the rotational position of a shaft, the combination comprising: a toothed disk of ferromagnetic material coupled to the shaft and rotatable in accordance therewith; a ferromagnetic core inductor positioned adjacent said disk for modulating an applied alternating current signal to have first and second voltage amplitudes in accordance with the reactance of said ferromagnetic core inductor, said ferromagnetic core inductor presenting a first inductive reactance when a tooth in said disk is adjacent the inductor and a second inductive reactance when a space between teeth on said disk is adjacent the inductor; means for applying the alternating current signal across said inductor; and means responsive to the modulated alternating current signal for generating output signals in accordance with the voltage amplitude of the modulated alternating current signal so that said output signals represent the rotational position of said disk relative to said inductor.

3. A bidirectional digital quantizer for generating electrical output signals representative of changes in the rotational position of a shaft, the combination comprising: a toothed disk of ferromagnetic material coupled to the shaft and rotatable in accordance therewith; a pair of first and second ferromagnetic core inductors positioned adjacent said disk and spaced from each other circumferentially about the reference circle defined by the teeth in said disk, said first ferromagnetic core inductor modulating a first applied alternating signal to first and second voltage amplitudes in accordance with the reactance of said ferromagnetic core inductors, each of said first and second ferromagnetic core inductors presenting a first inductive reactance when a tooth in said disk is adjacent the inductor and a second inductive reactance when a space between teeth on said disk is adjacent the inductor; means for applying the first and second alternating current signals across said first and second ferromagnetic core inductors, respectively; and means responsive to said first and second modulated alternating current signals for generating output signals in accordance with the voltage amplitudes of the modulated alternating current signals, said output signals representing the rotational position of said disk relative to said inductors.

4. A bidirectional quantizer for generating electrical output signals representative of changes in the rotational position of a shaft, the combination comprising: a circular mounting platform wheel; means coupled to the periphery of said platform including at least one region of ferromagnetic material, said wheel being rotatable in accordance with said shaft whereby said region is rotated, the path of said region through one rotation of said means defining a reference circle; an electromagnetic sensing element including a tuned circuit having an open core inductor with its gap positioned adjacent said reference circle for voltage modulating the amplitude of an applied current signal in accordance with an inductive reactance of said inductor, said inductor presenting a first inductive reactance when the gap in the core thereof is adjacent said ferromagnetic region and a second inductive reactance when the gap in said core is displaced from said ferromagnetic region whereby the voltage appearing across said inductor is indicative of the relative position of said ferromagnetic region and the gap of said core of said inductor; and means for applying the alternating current across said inductor.

5. In a bidirectional digital quantizer for generating electrical output signals representative of changes in the rotational position of a shaft, the combination comprising: a circular mount; coupling means inter-connecting said circular mount to said shaft for rotating said circular mount; a disk of ferromagnetic material coupled to the circular mount and rotatable in accordance therewith, said disk having a predetermined magnetization pattern; a tuned circuit including a capacitor and a ferromagnetic core inductor positioned adjacent said disk for modulating the voltage of an applied alternating current signal in accordance with the inductive reactance of said core inductor, said inductor presenting a first inductive reactance when adjacent an area of said disk in a first magnetic state and a second inductive reactance when adjacent an area of said disk in a second magnetic state; means for applying an alternating current signal across said inductor; and means responsive to the voltages appearing across said inductor for generating output signals representative of the voltages appearing across said inductor whereby said output signals represent the rotational position of said disk relative to said inductor.

6. A bidirectional digital quantizer for generating electrical output signals representative of changes in the rotational position of a shaft, the combination comprising: a disk composed at least in part of ferromagnetic material coupled to the shaft and rotatable in accordance therewith; said disk having alternate magnetic and nonmagnetic regions; a ferromagnetic core inductor for voltage modulating an applied alternating current signal in accordance with the inductive reactance of said ferromagnetic core inductor, said ferromagnetic core inductor presenting a first inductive reactance when a magnetic region of said disk is adjacent the inductor and a second inductive reactance when a nonmagnetic region is adjacent the inductor; means for applying the alternating current signal across said inductor; and means for generating output signals in accordance with the voltage of the voltage modulated alternating current signal whereby said output signals represent the rotational position of said disk.

7. A bidirectional digital quantizer for producing electrical output signals representative of incremental changes in the position of a shaft, the combination comprising: a patterned disk of ferromagnetic material coupled to the shaft and rotatable therewith, said pattern including areas of alternate states of magnetization; an electronic oscillator for generating an alternating current signal at a predetermined frequency; a tuned circuit including a capacitor and an inductor having first and second reactive impedances, said inductor including a ferromagnetic core and being positioned adjacent said disk, said inductor exhibiting said first reactive impedance to said alternating current signal when a pattern area of said disk in a first state of magnetization is adjacent the inductor and said second reactive impedance to said alternating current signal when a pattern area of said disk in a second state of magnetization is adjacent said inductor, said inductor being connected to said oscillator for receiving said alternating current signal to voltage modulate said current signal in accordance with the reactive impedance of said inductor; and means responsive to the voltage modulated alternating current signal for generating output signals representative of the voltage of said modulated alternating current signal whereby said signals are representative of the position of said disk relative to said inductor.

8. A bidirectional digital quantizer for generating electrical output signals representative of changes in the rotational position of a shaft, the combination comprising: a disk composed at least in part of ferromagnetic material coupled to the shaft and rotatable in accordance therewith; the circumferential periphery of said disk having alternate magnetic and nonmagnetic regions, a pair of ferromagnetic core inductors positioned adjacent said disk and spaced from each other about the circumferential periphery of said disk for voltage modulating a pair of first and second applied alternating current signals, respectively, in accordance with the inductive reactance of the respective ferromagnetic core; whereby each inductor presents a first inductive reactance when a magnetic region of said disk is adjacent the inductor and a second inductive reactance when a nonmagnetic region is adjacent the inductor; and means responsive to the impedance presented by each inductor for generating output signals representative of the rotational position of said disk relative to said inductors.

9. A bidirectional digital quantizer for producing electrical output signals representative of incremental changes in the position of a shaft and the sense of the changes, the combination comprising: a toothed disk of ferromagnetic material coupled to the shaft and rotatable therewith; an electronic oscillator for generating an alternating current signal at a predetermined frequency; a pair of tuned circuits connected to said oscillator for receiving said alternating current signal, each of said circuits including a capacitor and an inductor having a ferromagnetic core, said inductors being positioned adjacent said disk and being spaced from each other about the circumference of said disk, each of said inductors presenting a first reactive impedance to said alternating current signal when a tooth in said disk is adjacent the inductor and a second reactive impedance to said alternating current signal when the inductor is located adjacent a gap between the teeth in said disk; and means responsive to the voltage across said inductors for generating output signals representative of the position of said disk relative to said inductors.

10. A bidirectional digital quantizer for producing electrical output signals representative of incremental changes in the position of a shaft and the sense of the changes, the combination comprising: a toothed disk of ferromagnetic material coupled to the shaft and rotatable therewith; an electronic oscillator for generating an alternating current signal at a predetermined frequency; a pair of tuned circuits connected to said oscillator for receiving said alternating current signal, each of said circuits including a capacitor and an inductor having a ferromagnetic core, said inductors being positioned adjacent said disk and being spaced from each other about the circumference of said disk, whereby each of said inductors presents a first reactive impedance to said alternating current signal when a tooth in said disk is adjacent the inductor and a second reactive impedance to said alternating current signal when the inductor is located adjacent a gap between the teeth in said disk; first means responsive to the voltage across said inductors for generating output signals representative of the position of said disk relative to said inductors; and second means, connected to said first means and operable in response to said output signals to provide further signals representative of change in the position of the shaft and the sense of the changes.

11. In a digital computer which includes a bidirectional digital quantizer for producing electrical output signals representative of incremental changes in the position of a shaft and the sense of the changes, the combination comprising: a patterned disk of ferromagnetic material coupled to the shaft and rotatable therewith, said pattern including areas of alternate states of magnetization; an electronic oscillator for generating an alternating current signal at a predetermined frequency; a tuned circuit connected to said oscillator for receiving said alternating current signal, said circuit including a capacitor and an inductor having a ferromagnetic core, said inductor being positioned adjacent said disk, said inductor exhibiting a first reactive impedance to said alternating current signal when a pattern area of said disk in a first state of magnetization is adjacent the inductor and a second reactive impedance to said alternating current signal when a pattern area of said disk in a second state of magnetization is adjacent said inductor; means for varying the reactance of said tuned circuit; and means responsive to the voltage across said inductor for generating output signals representative of the position of said disk relative to said inductor.

References Cited in the file of this patent

UNITED STATES PATENTS

| | | |
|---|---|---|
| 2,730,698 | Daniels | Jan. 10, 1956 |
| 2,765,459 | Winter | Oct. 2, 1956 |
| 2,947,929 | Bower | Aug. 2, 1960 |
| 3,041,598 | Betts | June 26, 1962 |